Jan. 5, 1960        R. C. RUSSELL        2,919,774
BLOCKER TYPE SYNCHRONIZING MEANS FOR A POSITIVE CLUTCH
Filed March 9, 1956        2 Sheets-Sheet 1

INVENTOR.
ROBERT C. RUSSELL
BY
ATTORNEYS

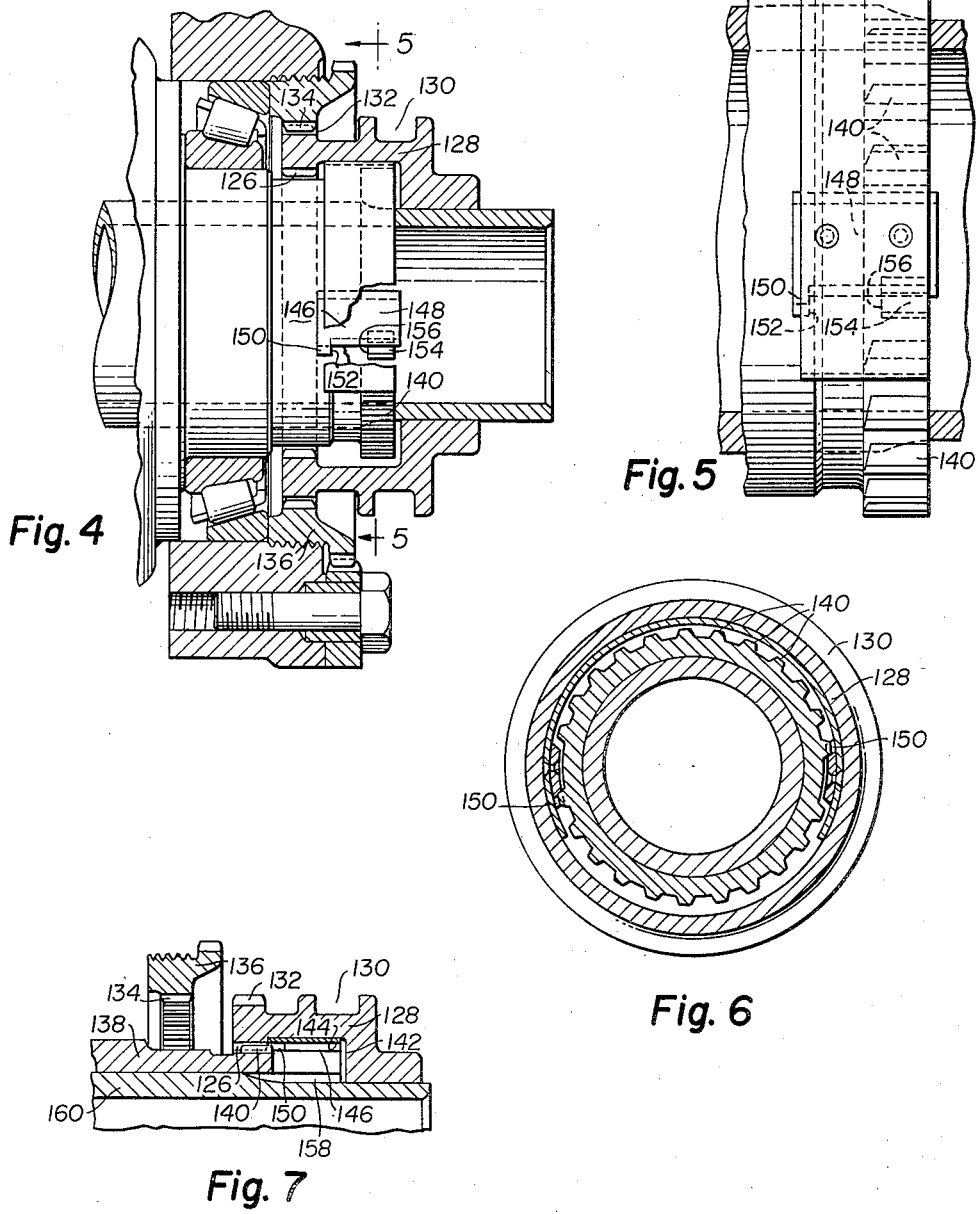

United States Patent Office 2,919,774
Patented Jan. 5, 1960

2,919,774

BLOCKER TYPE SYNCHRONIZING MEANS FOR A POSITIVE CLUTCH

Robert C. Russell, Shaker Heights, Ohio, assignor to Eaton Manufacturing Company, Cleveland, Ohio, a corporation of Ohio Application March 9, 1956, Serial No. 570,487

12 Claims. (Cl. 192—53)

The present invention relates to a positive blocker type synchronizing means for a toothed clutching device.

In the blocker devices heretofore disclosed for positive type clutches, the blocker is used to prevent clutch engagement when there is an appreciable difference in speed between the input and the output members. When the relatively rotatable members approach synchronous speed, the clutch members are free to attempt engagement even though there is still enough difference in speed to cause damage or excessive wear to the clutch teeth.

It is an object of this invention to provide a positive blocker type synchronizing clutch in which there will be no sharp impacting of the clutch teeth.

Another object is to provide a synchronizing clutch in which there must be a very slight reversal of relative rotation before the clutch members will be allowed to engage.

Still another object is to provide a clutch in which the clutch members are positively held from engagement until such time as the relative rotation of the clutch members allows engagement.

Another object is to provide a clutch mechanism in which there will be relatively little wear on the corners of the clutch teeth because undesirable engagements are prevented.

Yet another object is to provide a synchronizing clutch mechanism wherein the synchronizing mechanism provides for immediate engagement after there is a slight reversal of rotation of the clutch members.

Still another object is to provide a clutch mechanism in which a simple and effective synchronizing means is provided which effects a smooth and quiet shift.

These and other objects and advantages will become more apparent from the following detailed description of the device and from the accompanying drawings.

In the drawing,

Figure 4 shows a modification of the clutch synchronizer disclosed in Figure 1.

Figure 5 is an enlarged view of a portion of the structure shown in Figure 4.

Figure 6 shows a sectional view taken along line 5—5 of Figure 4.

Figure 7 shows the clutch structure disclosed in Figure 4 in a different stage of clutch operation.

Figure 1:
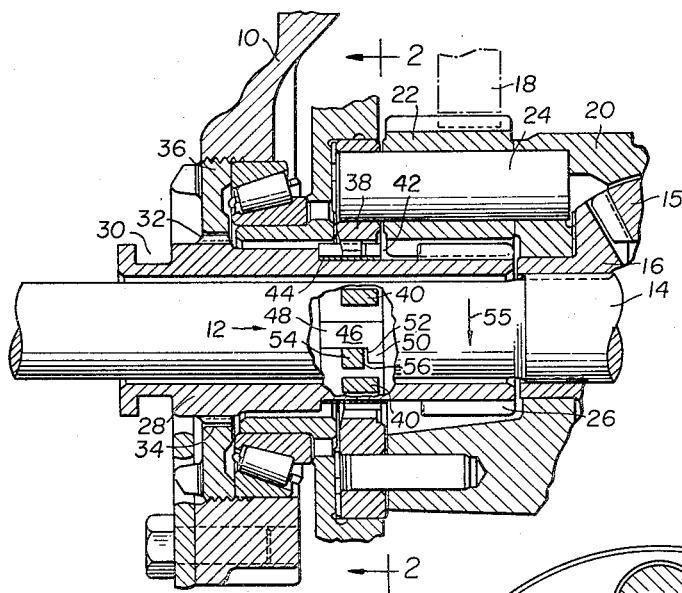
Figure 1 shows a side elevation in partial section of a mechanism in which one embodiment of the present invention is utilized.

Referring in detail to Figure 1 of the drawing, a housing 10 supports and encloses a clutch structure 12. A shaft 14 is adapted to be driven by a differential side pinion 15 and gear 16. A ring gear 18 is driven by an input means, not shown. A planet pinion carrier 20 mounts pinions 22 on shafts 24, the pinions meshing with the ring gear 18 and also with a sun gear 26. The sun gear 26 is fixed to an axially shiftable sleeve 28 and the sleeve 28 is provided with an annualy recessed portion 30 wherein a bifurcated shifting mechanism is located, but not shown in the drawing. Also fixed to the sleeve 28 is a row of circumferentially arranged teeth 32 which can be selectively engaged with teeth 34 which are formed in a differential bearing adjuster 36. The bearing adjuster 36 is secured to the housing 10 by a threaded connection. When these teeth are so engaged, the sun gear 26 is not rotatable.

An annular member 38 is fixed to the pinion shafts 24 and has teeth 40 formed internally thereon. Shift sleeve 28 has an annularly recessed portion 42 adjacent the sun gear 26 wherein an arcuate resilient band 44 frictionally engages the shift sleeve and is free to move axially with respect to the shift sleeve within the axial confines of the annular recessed portion 42 of the shift collar. The resilient band 44 may be made of any suitable material which is resilient enough to frictionally grip the shift sleeve.

Attached to the band 44 by any suitable means such as screws, welding or rivets, are a plurality of blocker elements 46 having an axially extending body portion 48 and a laterally extending tooth or ear portion 50, having a blocking surface 52.

Figure 2:
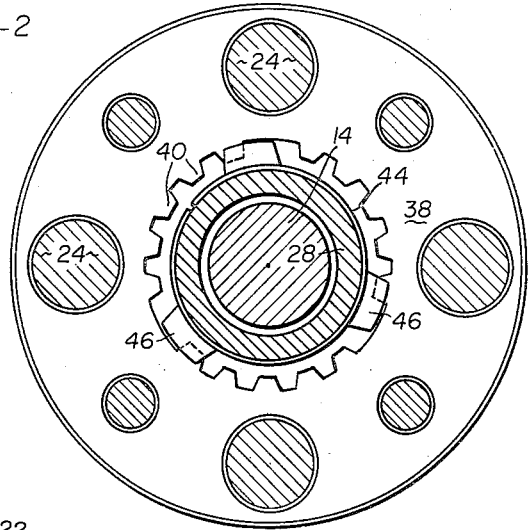
Figure 2 shows a sectional view taken along line 2—2 of Figure 1.

In carrying out the invention in one embodiment, one of the teeth 40 is removed for each blocker element, as shown in Figures 1 and 2, so that each blocker element is free to pass between the adjacent remaining teeth. In the actual manufacture of the toothed element 38, it would be merely a matter of choice to form element 38 so that the one tooth would have to be removed or to form element 38 initially without the tooth. The total width of the blocker element 46 is slightly less than the distance between the adjacent remaining teeth. However, this structure could be modified by arranging all of the teeth with an equal circular pitch and making the total width of the blocker element slightly less than the distance between adjacent teeth. This would be especially true where the circular pitch of the teeth is considerably greater than shown in Figures 1 and 2. The illustrated structure is preferred because the body portion 48 of the blocker element can be made wider, resulting in greater strength.

Three of the described blocker elements are shown and are equally spaced circumferentially. However, a single blocker element could be used, or two, or any number which falls within the limits of sound structural design for a particular application.

In the preferred form of the invention, the clutch tooth 54 which is adjacent the blocker element 46 on the side of the blocker element having the laterally extending tooth portion 50 formed thereon, is of an axial length less than the other teeth 40. This tooth is made shorter so that when the element 46 is in a blocking position and the teeth of gear 26 are poised for engagement with teeth 40, the axial distance between the adjacent ends of the teeth of gear 26 and teeth 40 is kept to a minimum. This is the ideal condition because when element 46 moves to a non-blocking position, the teeth of gear 26 will have only a very short axial distance to travel before being engaged with teeth 40 and the magnitude of the asynchronous rotation is just sufficient to insure instance engagement. However, the blocker mechanism would still be operative even if the tooth 54 was not axially shortened and such an arrangement, cooperating with the novel blocker element disclosed herein, comes within the scope of this invention. But, the short tooth is highly desirable and also constitutes a part of the invention.

In this type blocker arrangement, a preloaded type sleeve shifting mechanism is required because the teeth of gear 26 must be ready to move instantaneously into engagement with the teeth 40 when the blocker mechanism allows the shift to take place. Consequently, the sleeve 28 is moved as far as possible by a shifting mechanism which keeps urging the sleeve to the extreme position until the blocker moves to a non-blocking position and then the shift is completed. Such a shifting mechanism is disclosed in the Russell Patent No. 2,715,217, patented August 9, 1955.

The mode of operation of the clutch is as follows. Assume the teeth of gear 26 and teeth 40 to be in the disengaged position shown in Figure 1 and it is desired to move them to an engaged position. The sleeve 28 is moved to the left, as viewed in Figure 1, until the teeth 32 are disengaged from the teeth 34 and the mechanism is then in neutral. In the neutral position, the teeth of gear 26 are still axially spaced from teeth 40 and the sleeve 28 is in a position approximately midway between the position shown in Figure 1 and Figure 3. Conditions are such that the teeth of gear 26 are rotating faster than the teeth 40 with both sets of teeth moving in the direction of arrow 55. Since band 44 is in frictional engagement with the sleeve 28, the sleeve 28 will tend to overspeed the teeth 40 and tooth 54 and consequently the blocker element 46 will abut a side face of tooth 54.

Continued movement of the sleeve 28 in a clutch engaging direction results in a relative axial movement of the sleeve 28 with respect to the band 44 until the ends of the teeth of gear 26 abut the edge of band 44. As long as the teeth of gear 26 overspeed teeth 40, the blocker element 46 prevents continued axial movement of sleeve 28 because the surface 52 of blocker 46 abuts surface 56 of tooth 54.

When the teeth 40 accelerate or the teeth of gear 26 decelerate until the direction of relative rotation between the rows of teeth changes, the blocker 46 rotates away from tooth 54 toward the adjacent tooth 40 until the portion 50 clears tooth 54 and surfaces 52 and 56 no longer abut. At this time, the teeth of gear 26 on sleeve 28 are free to continue moving axially until teeth of gear 26 mesh with teeth 40. The band 44 merely moves axially along with sleeve 28. From this description it is obvious that the teeth of gear 26 and teeth 40 are free to engage only when the relative rotation between them is so slight that proper engagement is insured.

Figure 3:
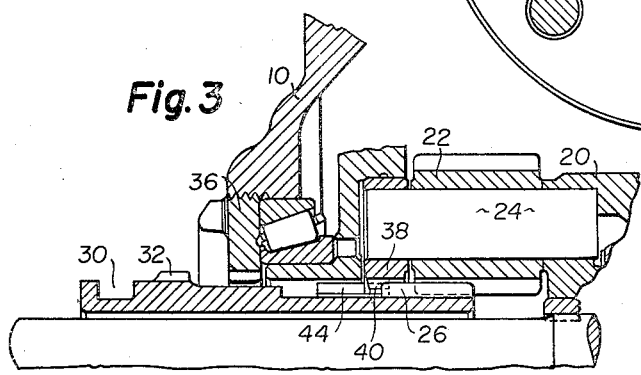
Figure 3 shows the clutch in a different stage of clutch operation.

It is to be noted that when the teeth of gear 26 and teeth 40 are engaged, the band 44 could conceivably be moved further to the left as viewed in Figure 3, until the blocker element 46 and teeth 40 no longer axially overlap. This presents no problem because when sleeve 28 is moved in a clutch disengaging direction, the end wall of the recess 42 which is remote from teeth 26, will abut the edge of band 44 and move the blocker 46 into an axially coextensive position with teeth 40.

Referring now to Figures 4 and 5, a modification of the afore mentioned and described device will be explained.

An annular row of internal clutch teeth 126 are formed on a sleeve 128 and clutch teeth 140 are formed on a sleeve member 138. The sleeve 128 is splined at 158 to a member 160. Therefore, when teeth 132, 134 are engaged, member 160 is fixed from rotation and when teeth 126, 140 are engaged, sleeve 138 and member 160 are constrained to rotate together.

Sleeve 128 has an internal annular recessed portion 142 in which is provided a resilient expanding band 144 which is frictionally engaged with the sleeve 128. A blocker element 146 is suitably attached to the band 144 as by rivets, screws or by welding. The blocker element 146 has an axially extending main body portion 148 and a laterally extending tooth or ear portion 150 with a blocking surface 152.

One of the teeth 140 is removed and the tooth 154, adjacent the space from which the tooth 140 was removed, is axially shorter than the teeth 140 for the same reasons as set forth in the explanation of the structure in Figure 1. Tooth 154 has an abutting surface 156. The total width of blocker element 146 is slightly less than the space between tooth 154 and the remaining adjacent tooth 140. However, an alternate design would be to arrange all of the teeth with an equal circular pitch and make the blocker element 146 correspondingly narrower. Such a design would be more feasable if the circular pitch of teeth 140 would be greater than shown in Figure 4.

Any number of blocker elements may be used. Two oppositely disposed blocker elements are shown in Figure 6 but that number may be increased or decreased.

The structure shown in Figures 4 to 6 operates in the same manner as the structure shown in Figures 1 to 3. Assume the clutch to be in a position such that the teeth 126, 132 are completely disengaged and the sleeve 128 is urged to the right as viewed in Figure 4. If operating conditions are such that the sleeve 128 is overspeeding sleeve 138, the blocker element 146 will be urged to abut the side of tooth 154 and surface 152 of blocker element 146 will abut surface 156 on tooth 154, thereby preventing engagement of teeth 126 and 140.

When the sleeve 128 decelerates or the sleeve 138 accelerates to the point where the relative direction of rotation is reversed, the blocker element 146 will move rotatably away from tooth 154 until abutting surfaces 152 and 156 clear each other. At this point, the sleeve 128 is free to continue axial movement until teeth 126 and 140 are fully engaged.

The structure shown in Figure 1 and in Figure 4 is so constructed that the clutch teeth cannot come into contact until there has been a slight reversal of rotation. This slight rotation is desirable because if the rows of teeth are not exactly angularly phased, slight rotative movement will phase the teeth for immediate engagement.

The novel structure herein disclosed insures a smooth, quiet shift with a minimum amount of wear to the corners of the teeth.

While the present invention has been described in connection with certain specific embodiments, it is to be understood that the foregoing description is merely exemplary and that the concept of this invention is susceptible of numerous other modifications, variations and applications which will be apparent to persons skilled in the art. The invention is to be limited therefore, only by the broad scope of the appended claims.

What I claim is:

1. In a clutch synchronizing mechanism, a pair of rotatable members axially movable relative to each other, each of said members having selectively engageable clutch teeth, an arcuate resilient band frictionally engaging one of said members, an L-shaped key fixedly attached to said band, said key being at least partially between the teeth on the other of said members and in a blocking position when the said members tend to rotate relative to each other in one direction of rotation, said key moving to a non-blocking position and allowing the teeth on said one member to engage with the teeth on said other member when the said members rotate relative to each other in an opposite direction of rotation.

2. In a clutch mechanism, a pair of rotatable, clutch teeth carrying members movable axially relative to each other, at least one blocker tooth, an arcuate band having said blocker tooth mounted thereon, said arcuate band being frictionally mounted on one of said members, said blocker tooth having a body portion extending between adjacent clutch teeth on the other of said members and a laterally projecting portion of an axial length less than the axial length of said body portion, said laterally projecting portion having a circumferentially extending surface intermediate the axial extremity of said body portion, said surface abutting an end face of one of said clutch teeth carried by one of said carrying members when said carrying members tend to rotate relative to each other in one direction of rotation, said laterally projecting portion moving to a non-abutting position when said carrying members rotate relative to each other in an opposite direction of rotation and allowing said clutch teeth on said carrying members to move axially relative to each other to a clutch engaged position.

3. A positive blocker type synchronizing clutch mechanism comprising a driving member, a driven member, selectively engageable clutch teeth carried by said driving and driven members, said members being relatively axially movable toward each other to effect engagement of said clutch teeth, an arcuate resilient band frictionally carried by one of said members, blocker means mounted on said band and having a longitudinally extending body portion extending between adjacent clutch teeth on the other of said members and a tooth portion extending generally normal to the clutch axis of rotation, said tooth portion having a circumferentially extending surface intermediate the axial extremity of said body portion, said surface abutting one of said clutch teeth on said other member when said driving and driven members tend to rotate relative to each other in one direction of rotation, and said tooth portion moving to a position allowing engagement of the clutch teeth when said driving and driven members rotate relative to each other in the other direction of rotation.

4. In a clutch mechanism, a rotatable driving member, a rotatable driven member, said members being relatively axially movable toward each other, radially disposed selectively engageable clutch teeth being provided on said driving and driven members, a resilient arcuate band disposed in frictional engagement with one of said members, said arcuate band being carried in an annularly recessed portion of said one member, at least one blocker element mounted on said arcuate band, said blocker element having an axially extending body portion which extends at least partially between adjacent clutch teeth on the other of said members, said blocker element also having a tooth portion which is laterally extending with respect to the clutch axis of rotation and of an axial length less than the axial length of said body portion of said blocker element, and said blocker element being of an overall width less than the distance between the clutch teeth on the said other member which are adjacent the said blocker element.

5. A clutch mechanism having a drive member, a driven member, a plurality of annularly disposed, radially directed clutch teeth on one of said members, a plurality of annularly disposed, radially directed clutch teeth on said other member engageable with said teeth on said one member, an arcuate resilient band frictionally engageable with and axially confined on said one member, blocker means mounted on said band and having an axially disposed body portion and a tooth portion extending transversely from said body portion, said body portion of said blocker abutting a side portion of one of said teeth on said other member and said tooth portion of said blocker element abutting an end of said one tooth when said members are rotating relative to each other in one direction of rotation and said members are being urged in a clutch engaging direction, thereby preventing clutch engagement until there is a slight reversal of rotation of said members, said clutch teeth on said other member being equally spaced circumferentially except for the space between said one tooth and the adjacent tooth disposed on the other side of said blocker element from said one tooth, said blocker element being narrower than said space but wider than the space between each of said other teeth on said second rotatable member.

6. A clutch according to claim 5 wherein said one tooth is cut away on the end abutted by said tooth portion of said blocker element so that said tooth is axially shorter than the remainder of said clutch teeth on said other member.

7. In a clutch mechanism, a first rotatable member having a plurality of radially disposed, external type clutch teeth, a second rotatable member having a plurality of radially disposed, internal type clutch teeth adapted to mesh with said first mentioned clutch teeth, said members being relatively axially movable toward each other, an annularly recessed portion on said first member immediately adjacent said first mentioned clutch teeth, at least one blocker element, an arcuate band connected to said blocker element, said band being disposed in said annularly recessed portion and having limited axial movement relative to said first rotatable member, said blocker element having an axially extending body portion and a tooth portion extending transversely from said body portion, said body portion abutting a side of one of said teeth on said second rotatable member and said transversely extending tooth portion abutting an end of said one tooth when said internal and external type clutch teeth are urged in a clutch engaging direction and said clutch teeth are rotating asynchronously in one direction of rotation.

8. A clutch according to claim 7 wherein said one tooth is cut away on said end abutted by said transversally extending tooth portion so that said tooth is axially shorter than the remainder of said teeth on said second rotatable member.

9. A clutch according to claim 7 wherein said teeth on said second rotatable member are equally spaced circumferentially except for the space between said one tooth and the adjacent tooth disposed on the other side of said blocker element from said one tooth, said blocker element being narrower than said space but wider than the space between each of said other teeth on said second rotatable member.

10. In a clutch mechanism, a first rotatable member having radially disposed, internal clutch teeth, an internal annularly recessed portion of said member adjacent said clutch teeth, a second rotatable member having radially disposed, external clutch teeth adapted to engage with said first mentioned teeth, an arcuate band member disposed in said internal annularly recessed portion and constrained to move axially with said first member, at least one blocker element attached to said arcuate band, said blocker element having an axially extending body portion and a tooth portion extending transversely from said body portion, said body portion abutting a side of one of said teeth on said second rotatable member and said transversally extending tooth portion abutting an end of said one tooth when said internal and external clutch teeth are urged in a clutch engaging direction and said clutch teeth are rotating asynchronously in one direction of rotation.

11. A clutch according to claim 10 wherein said one tooth is cut away on said end abutted by said transversally extending tooth portion so that said tooth is axially shorter than the remainder of said teeth on said second rotatable member.

12. A clutch according to claim 10 wherein said teeth on said second rotatable member are equally spaced circumferentially except for the space between said one tooth and the adjacent tooth disposed on the other side of said blocker element from said one tooth, said blocker element being narrower than said space but wider than the space between each of said other teeth on said second rotatable member.

References Cited in the file of this patent

UNITED STATES PATENTS

| 2,488,044 | Voigt | Nov. 15, 1949 |
| 2,518,735 | Wemp | Aug. 15, 1950 |
| 2,667,251 | Banker | Jan. 26, 1954 |